Figure 1:
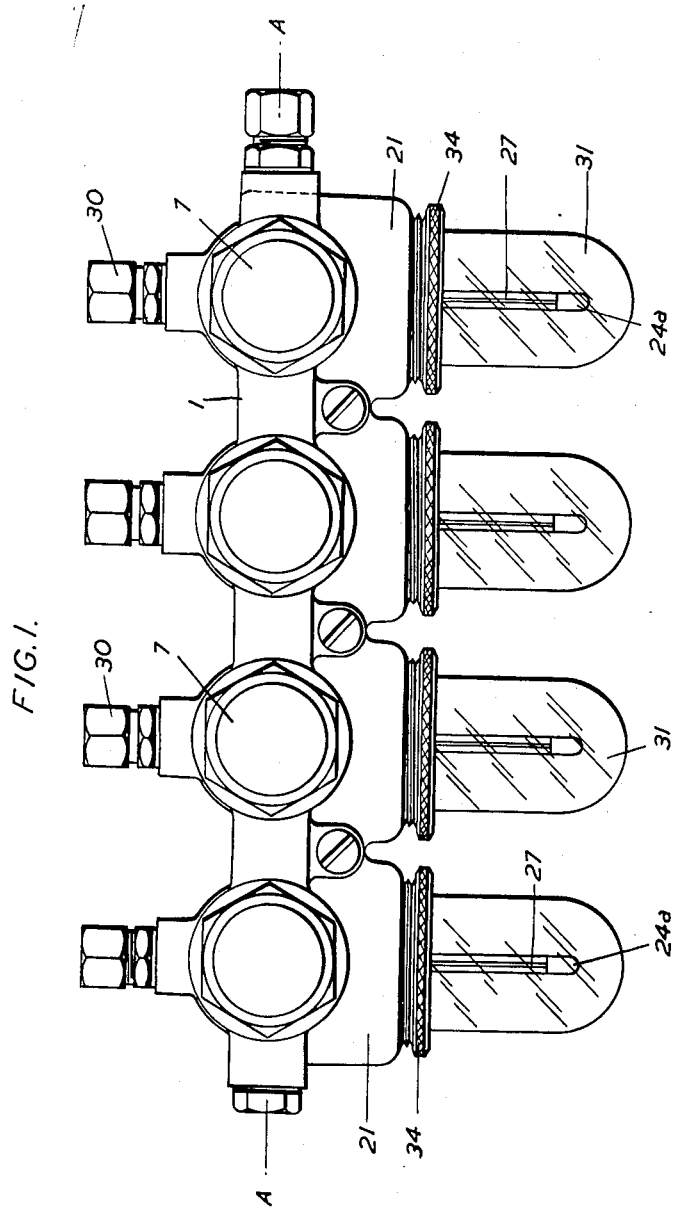

Dec. 27, 1955        C. C. S. LE CLAIR        2,728,415
LUBRICANT METERING AND INDICATOR UNIT
Filed April 24, 1952        6 Sheets-Sheet 1

Inventor
Camille Clare Sprankling LeClair
By
Attorneys

Dec. 27, 1955     C. C. S. LE CLAIR     2,728,415
LUBRICANT METERING AND INDICATOR UNIT
Filed April 24, 1952     6 Sheets-Sheet 2

Inventor
Camille Clare Sprankling Le Clair

Dec. 27, 1955  C. C. S. LE CLAIR  2,728,415
LUBRICANT METERING AND INDICATOR UNIT
Filed April 24, 1952  6 Sheets-Sheet 4
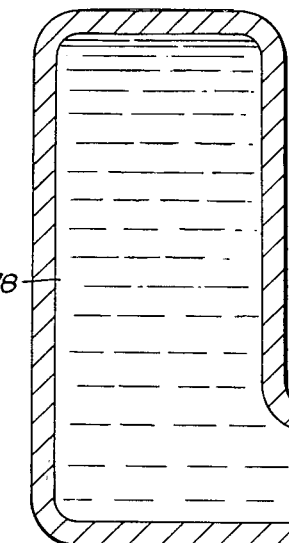
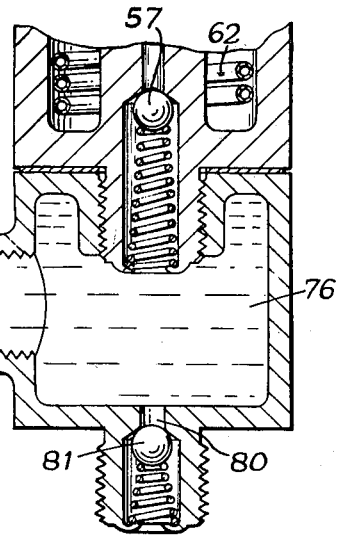
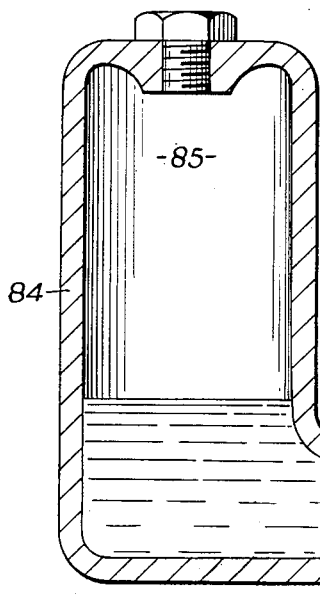
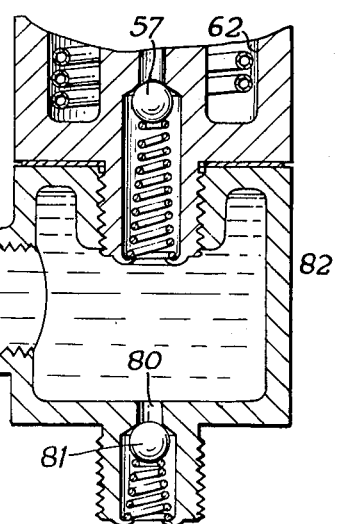
Fig. 5.
Fig. 6.
INVENTOR
Camille Clare Sprankling Le Clair
BY
Mann, Brown and Hansmann
ATTORNEYS.

Dec. 27, 1955     C. C. S. LE CLAIR     2,728,415
LUBRICANT METERING AND INDICATOR UNIT
Filed April 24, 1952     6 Sheets-Sheet 5

INVENTOR
Camille Clare Sprankling Le Clair
BY
Mann, Brown and Hansmann
ATTORNEYS.

Dec. 27, 1955   C. C. S. LE CLAIR   2,728,415
LUBRICANT METERING AND INDICATOR UNIT
Filed April 24, 1952   6 Sheets-Sheet 6

INVENTOR
Camille Clare Sprankling Le Clair
BY
Mann, Brown and Hansmann
ATTORNEYS

United States Patent Office 2,728,415
Patented Dec. 27, 1955.

2,728,415

LUBRICANT METERING AND INDICATOR UNIT

Camille Clare Sprankling Le Clair, Crabtree, Plymouth, England, assignor to Tecalemit Limited, Brentford, England Application April 24, 1952, Serial No. 284,149

7 Claims. (Cl. 184—7)

This invention relates in general to lubricant and liquid distribution systems, but more particularly to lubricant distribution systems, for use in automobile vehicles and machinery, of the type in which a main lubricant carrying conduit is provided with branch conduits carrying lubricant, such as oil, to bearings and other parts requiring lubrication. Hereinafter lubricant and liquid distribution systems will be referred to as "lubricant distribution systems."

The invention also relates to lubricant distributing systems in which a stream of lubricant under pressure is divided into a number of subsidiary streams in predetermined proportions by means of metering or other distributing or flow control devices, which are referred to hereinafter as "metering devices" or "metering units" the first essential of any such system being that across each metering device there shall be a pressure drop which is large in comparison to the pressure drop along the length of the main conduit.

According to the present invention, the flow of oil to a bearing or other place of use of the oil takes place from a main conduit through a metering device comprising a tube of capillary dimensions which is relatively long and has a proportionately relatively large diameter, the arrangement being such that the required pressure drop exists between the ends of the tube and such that the pressure drop is large in comparison with the pressure drop over the length of the main conduit, the oil discharged from the metering device being fed into a rising drop indicator comprising a transparent bowl which encloses a J-shaped outlet tube, the inlet end of which is connected to the discharge side of the metering device, and a fine-gauge rod, the lower end of which is mounted in the open discharge end of the said tube, the upper end of the rod being engaged in an outlet passage which is connected to the bearing or other place of use.

Each metering device may comprise resilient means which is arranged in a chamber into which oil is discharged from the capillary tube, the pressure of the oil at the discharge end of the latter then being determined by the resistance to compression of the said means and not by the resistance of the bearing.

The lubricating system may comprise a number of the combined metering device and rising drop indicator units arranged in scattered relationship on the vehicle or machine. On the other hand a number of such units may be grouped in a manifold comprising a supply oil passage or main from which all the metering devices are supplied with oil and separate outlets connected to different bearings or other places of use.

The said main is connected to means, such as a pump, by means of which pressure is imposed intermittently on the oil fed to the metering devices.

Figure 2:
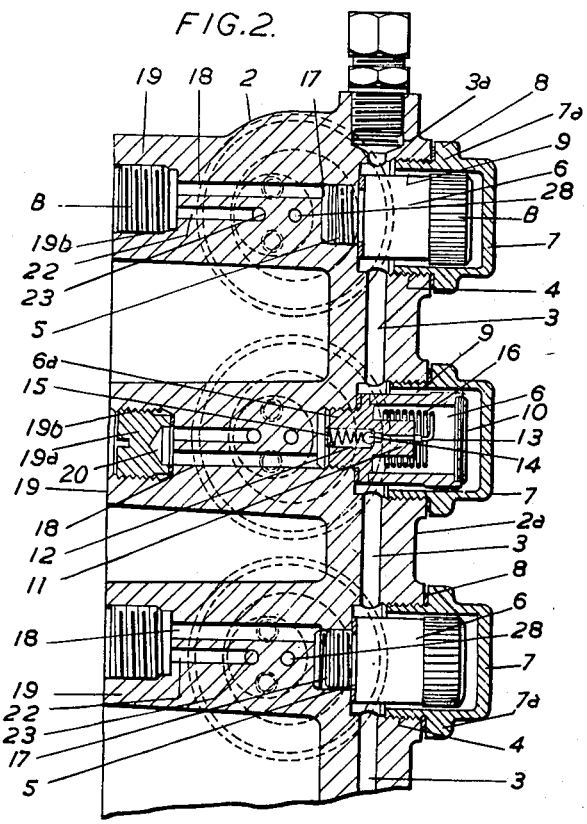
Figure 3:
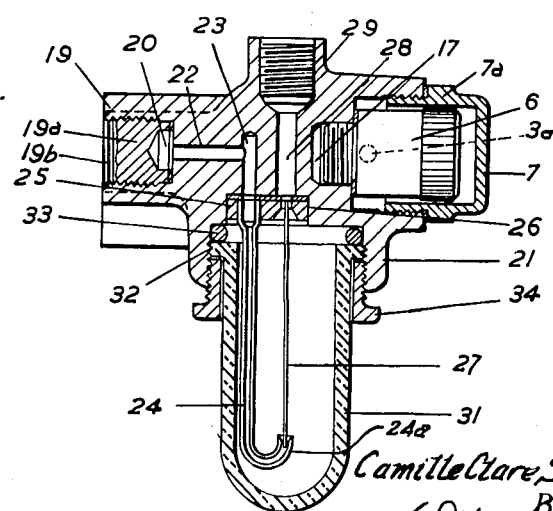
Figure 4:
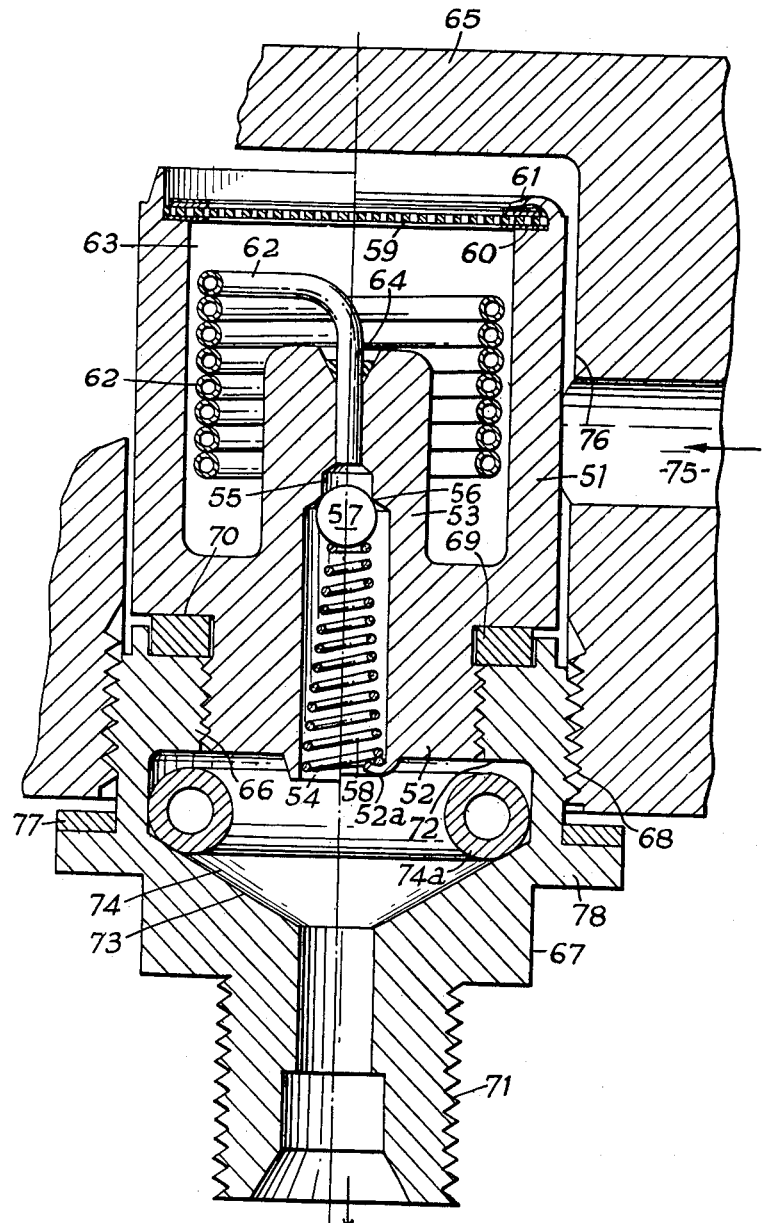

Several constructional forms of the invention, applied to a lubricating system adapted to feed metered quantities of oil to a number of spaced places of use on a vehicle or machine, are shown, by way of example, in the accompanying drawings, wherein:

Figure 1 is an outside elevation of a manifold fitted with four metering units;
Figure 2 is a section on the line A—A in Figure 1;
Figure 3 is a section on the line B—B in Figure 2;
Figure 4 is a cross-sectional view of a metering device employed in connection with my invention;
Figures 5–9 are cross sectional views illustrating modified forms of the device shown in Figure 4; and
Figure 10 is a cross-sectional view similar to that of Figure 3 illustrating the device of Figure 4 as incorporated in the manifold.

Referring to the drawings:

The manifold 1 comprises a body part 2 formed with a longitudinal inlet passage 3 which is connected at one end 3a to a source of supply of oil, the opposite end of the passage either being plugged or connected to a similar manifold or to one or more places of use of the oil. The body is also formed with a number of longitudinally-spaced, transverse bores 4 which are open to one side face 2a of the manifold and intersect the inlet passage 3 and communicate with threaded holes 5 on the opposite side of the passage.

The shank of the hollow body 6 of an oil metering unit, which is similar to such units described in my co-pending application Serial No. 223,923, filed May 1, 1951, now abandoned, is screwed into each of the said threaded holes 5, the hollow body extending transversely across the said oil inlet passage 3 and projecting outwards beyond the said side face 2a of the manifold. The portion of each transverse bore 4 between the said face 2a of the manifold and the oil inlet passage 3 is threaded to receive the threaded shank of a hollow cap 7 having a flange 7a which bears against a sealing washer 8 fitted between the said face and the head. The diameter of the bore of each cap 7 is greater than the outside diameter of the body 6 of the metering unit, so that an annular space 9 which communicates with the said longitudinal inlet passage 3 in the manifold, is left in the cap around the metering unit body.

The outer end of each metering unit body 6, which is spaced from the inner surface of the outer end of the head of the cap, is fitted with a filter disc member 10 which may, for example, be made up of an apertured metal washer, a disc of coarse gauze, an apertured paper washer, a paper filter disc, a second apertured paper washer, a disc of fine gauze and a third apertured paper washer, the latter being on the inside of the filter disc member and the said metal washer on the outside thereof.

Each metering unit body comprises an internal boss 11 which is coaxial with the threaded shank 6a of the body and extends outwardly from the base of the body in a direction opposite to that of the shank. The shank is bored centrally and the inner end of the bore 12 communicates with an oil discharge passage 13 formed in the inner boss, a valve seat being formed at the junction of the bore of the shank and the discharge passage. A non-return ball valve 14 is normally held against the valve seat by a spring 15.

A coiled metal tube 16 of capillary dimensions is arranged in the bore of the body 6, one end of the tube being open to the bore and the opposite end being fitted in the end of the said discharge passage 13 in the boss 11 in the body.

The inner end of the shank of the body of each metering unit is spaced from the bottom of the threaded hole 5 into which the shank is screwed so as to provide a chamber 17 to which one end of a longitudinal passage 18 provided in a branch 19 projecting laterally from the manifold body part is connected. The opposite end of the said longitudinal passage 18 is connected to a transfer chamber 20 (see Fig. 3) formed in a plug 19a screwed into a threaded hole 19b at the outer end of the said branch which is coaxial with the above mentioned cap 7 in which the body 6 of the metering unit is arranged.

The manifold body part comprises as many downwardly-projecting spaced bosses 21 as there are metering units, the axes of these bosses being disposed between the said chambers communicating with the discharge passages in the metering unit shanks and the transfer chambers.

Each transfer chamber 20 is connected by a horizontal passage 22 to a vertical outlet passage 23, the lower end of which is connected to a J-shaped small-bore outlet tube, the upper end of the longer limb 24 of which is supported in a disc pad 25 fitted in a recess 26 formed in the downwardly-projecting boss 21 below the longitudinal passage 23 in the manifold. The lower end of a fine-gauge wire rod 27 is mounted in the open end of the shorter limb 24a of the outlet tube, the upper end of the wire rod being engaged in the lower end of an outlet passage 28 which extends vertically upwards through the body and terminates in an outlet chamber 29 into which an outlet union 30 (see Fig. 1) supporting a discharge pipe (not shown) is screwed.

The J-shaped outlet tube 24, 24a and the wire rod 27 are enclosed in a glass bowl 31 which is detachably held in a recess 32, connected to the above mentioned recess 26 in the downwardly-projecting boss 21, between a sealing ring 33 and a sleeve 34 which is screwed into the first mentioned recess 32. The outlet tube and the wire rod form a rising drop indicator. The bowl 31 is filled with a solution of glycerine and water or water carrying in solution a mineral salt, such as for example, zinc sulphate, having the characteristics of water solubility, stability in solution, provision of high surface tension in solution at a reasonable concentration, and freedom from chlorides generally corrosive to ferrous metals. The wire rod provides means for the ascent of drops of oil in the solution, the drops, of course, being observable through the bowl.

The inlet end 3a of the longitudinal inlet passage 3 in the manifold body 2 is connected to means, such as a pump (not shown) by means of which pressure is imposed intermittently to oil fed into the passage. When such a pressure impulse is imposed on the oil, a quantity of oil is forced from the interior of each metering unit body 6 through the coiled capillary tube 16 therein and out of the discharge end of the tube. Each ball valve 14 is forced off its seat and oil is discharged into the chamber 17 at the inner end of the shank of the metering unit whence it flows through the passage 18 into the transfer chamber 20, and out of the latter through the passages 22 and 23 into the J-shaped outlet tube 24, 24a. From the latter drops of oil ascend the said wire rod 27 into the vertical outlet passage 28 in the manifold body and thence into the outlet chamber 29 communicating with the outlet passage and the outlet union.

In modifications each metering unit, like the metering devices described in my said application Serial No. 223,923 comprises an air or gas-filled sac on the discharge end of the capillary tube 16 so that, during the application of the transient pressure, oil from the capillary tube is discharged into a chamber in which the sac is located and the pressure of the oil at the discharge end of the capillary tube is then determined by the resistance to compression of the sac and not by the resistance of the bearing. During the relatively long interval between pressure impulses the oil stored in the chamber containing the sac would be slowly fed to the bearing under a pressure exerted upon it by the expanding air or gas in the sac.

Referring to Figure 4, wherein one such modification is illustrated, reference numeral 51 indicates a hollow cup-shaped body having a shank 52 and an internal boss 53 which is coaxial with the shank. The shank is bored centrally and the inner end of the bore 54 communicates with a discharge passage 55 formed on the boss, a valve seat 56 being formed at the junction of the bore of the shank and the discharge passage. A non-return ball valve 57 is normally held against the valve seat by a spring 58 reacting between the ball and a spun-over lip 52a on the shank 52.

The open end of the body 51 is closed by a filter disc member 59 which is held between a shoulder 60 in the body and a spun-over lip 61 at the end of the body.

A coiled metal tube 62 having a bore of capillary dimensions is arranged in the bore 63 of the body, one end of the tube being open to the bore and the opposite end 64 being fitted in the end of the discharge passage 55 in the boss 53.

The body 51 is arranged in the bore of a hollow casing 65, the shank 52 being threaded externally and screwed into the body part 66 of a hollow plug or nipple 67. The body part 66 is screwed into the threaded end 68 of the bore of the outer casing 65 and locks a sealing washer 69 between itself and a shoulder 70 on the body. The plug comprises a shank 71 which is threaded externally to screw into the bearing to be lubricated or to receive an oil feed pipe which connects the union to the bearing, which latter and the feed pipe are not shown in the figure.

The space between a shoulder 72 in the body part of the plug and a downwardly-sloping face 73 in the latter forms an oil acceptance chamber 74 and in it there is a ring-shaped air or gas-filled sac 74a of plastic or other flexible and resilient material having both ends sealed. The casing 65 is formed with an oil inlet 75 which is connected to the space between the bore 76 of the casing and the body 51 and to the space between the end of the bore and the filter disc member 59. In order to prevent leakage of oil from the interior to the exterior of the casing, a sealing washer 77 is also arranged between a flange 78 on the plug 67 and the casing.

The oil inlet 75 to the casing 65 is connected to means, such as a pump (not shown), by means of which pressure is imposed intermittently to the oil fed to the metering unit. When such a pressure impulse is imposed on the oil, a quantity of oil is forced from the bore 63 of the metering unit body 51 through the coiled capillary tube 62 and out of the discharge end 64 of the latter, the ball valve 57 is forced from its seat 56 and oil is discharged into the acceptance or sac containing chamber 24, compressing the air or gas filled sac 74a.

At the termination of each pressure impulse, the check valve 57 is reseated by the spring 58 and no more oil can enter the sac containing or acceptance chamber 74 until the succeeding pressure impulse takes place. During the relatively long intervals between pressure impulses the oil stored in the chamber 74 is slowly fed therefrom to the part to be lubricated under the pressure imposed upon it by the expanding air or gas in the sac 74a.

The air or gas-filled sac may, however, be replaced by a spring-loaded piston or spring-loaded diaphragm or by a relatively large volume of fluid or gas, the mass compression of which may be used to obtain a desired state of resilient acceptance of the oil in the acceptance chamber.

Thus, in one such construction, which is shown in Figure 5, the acceptance chamber 76 into which oil is discharged from the tube 62 communicates through a lateral passage 77 with a vertically disposed, large volume, closed pressure storage vessel 78. The vessel, the lateral passage and the acceptance chamber are all filled with oil. The base of the acceptance chamber is formed with an outlet 80 which is closed by a spring urged check valve 81.

In a modification shown in Figure 6, the acceptance chamber 82 and the lateral passage 83 are both filled with oil but the pressure storage vessel 84 is only partly filled with oil, the space 85 in the vessel between the oil and the top of the vessel being filled with gas or air.

Figure 7:
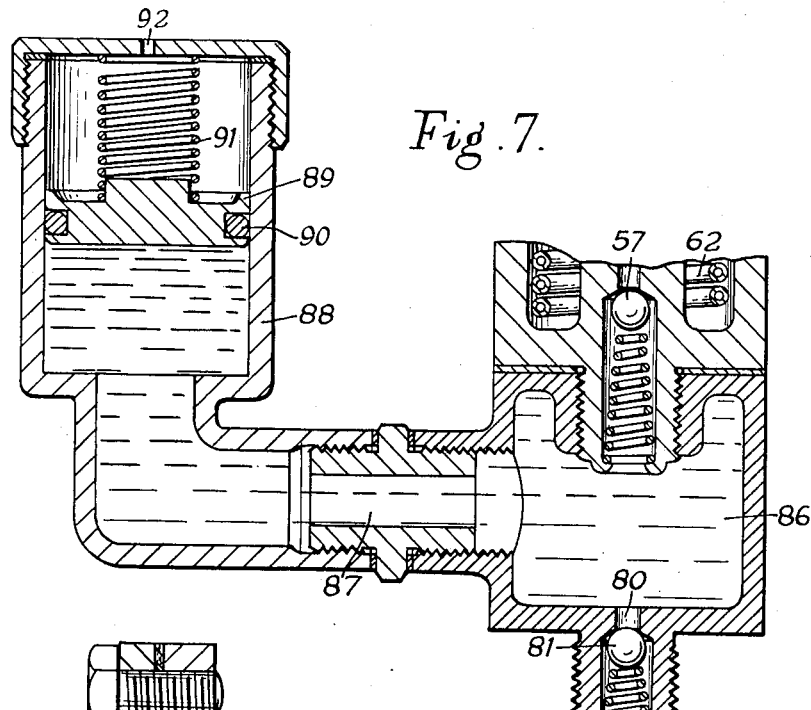

In another modification, see Figure 7, the acceptance chamber 86 and the lateral passage 87 are filled with oil, the pressure storage vessel 88 being only partially filled with oil. A piston 89 fitted with a ring-type gasket 90 is slidably arranged in the vessel. A coil spring 91 reacts between the top of the vessel and the piston and thus exerts pressure on the oil. An air vent 92 is formed in the top of the vessel.

Figure 8:
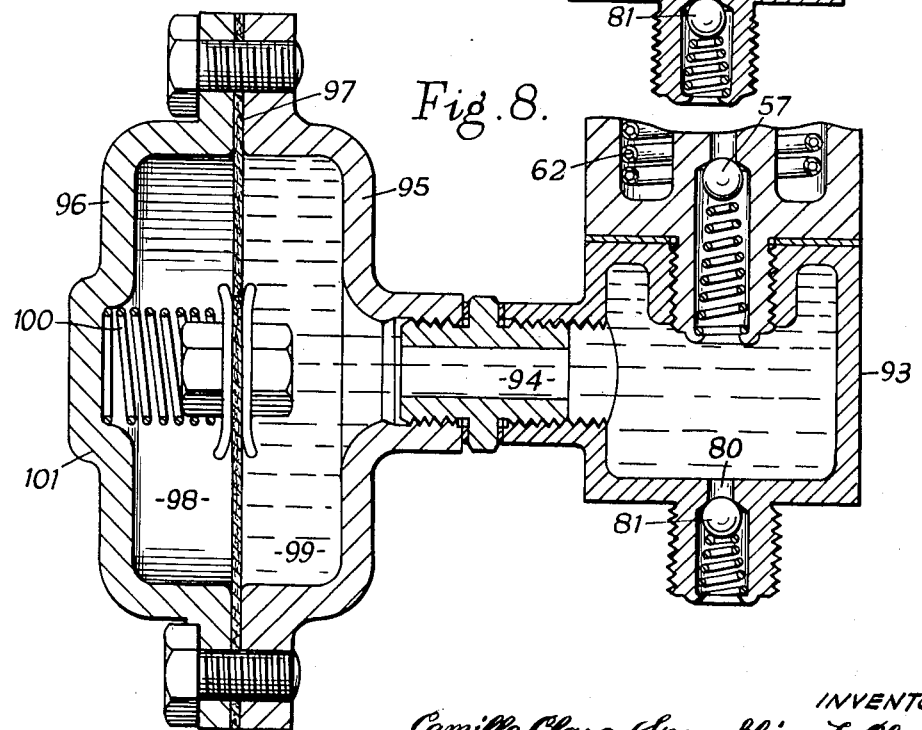

Figure 8 illustrates a further modification wherein the acceptance chamber 93 communicates through a lateral passage 94 with a pressure storage vessel consisting of two parts 95 and 96 containing a resilient diaphragm 97 which is clamped between the two parts of the vessel and thus divides the latter into two chambers 98 and 99. In the chamber 98 there is a coil spring 100 which reacts between the wall 101 of the vessel and the diaphragm, forcing the latter towards the acceptance chamber 93. The chamber 99 in the pressure storage vessel, the lateral passage 94, and the acceptance chamber 93 are filled with oil and the chamber 98 is gas or air filled.

Since it is desirable that the metering units shall be as compact as possible, the coiled capillary tube may also act as a spring, the discharge end of which may be formed to act as a check valve, thus avoiding the necessity of providing separate accommodation for a spring controlling a check valve at the discharge end of the capillary tube.

Figure 9:
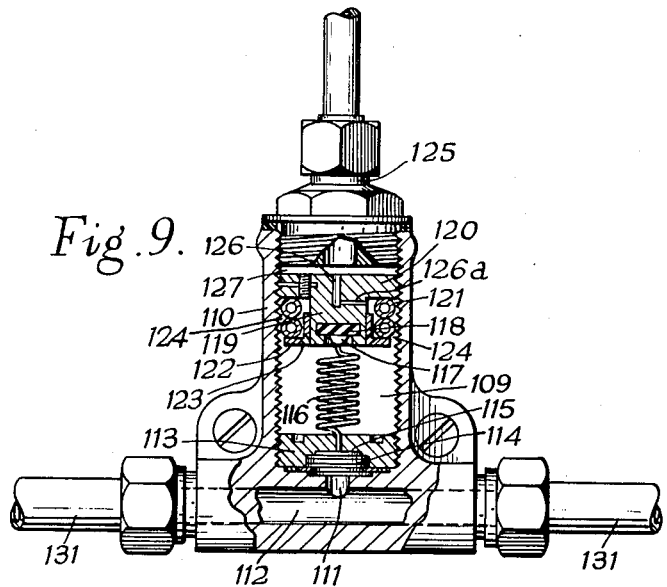
Figure 10:
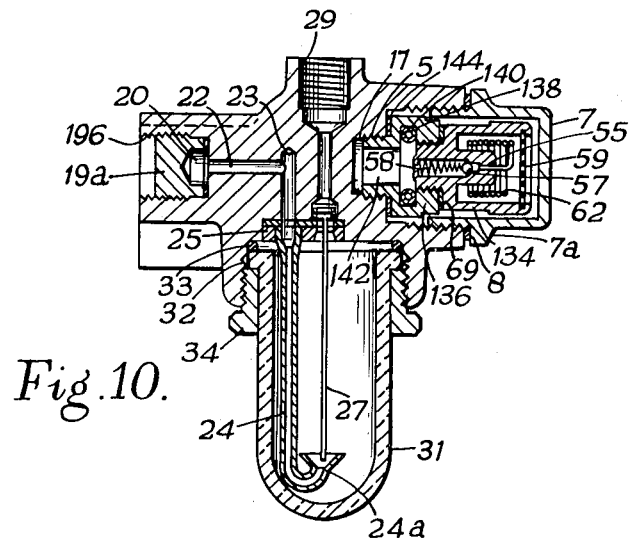

Thus, as shown in Figure 9, one end of the bore 109 of the metering unit body 110 may be formed with a port 111 communicating with the oil inlet chamber or passage 112, and a plug 113 fixed in the bore of the body immediately above the port may be fitted with a filter 114 arranged between the port and a passage 115 in which the inlet end of the coiled capillary tube 116 is fitted. The opposite end of the capillary tube 116 is fixed to an inverted cup valve 117 which cooperates with a valve seat formed by a disc 118 arranged in a neck 119 projecting inwardly from a disc 120 which is fixed in the bore of the body of the unit at a distance from the plug 113. Two coiled, sealed air or gas filled sacs 121 of resilient material, such as plastic, are arranged around the neck 119 between the inner face of the disc 120 and the lateral out-turned flange of a flanged collar 122 which is fixed onto the neck and is formed with ports 123 providing communication between the capillary tube chamber 29 and the acceptance or sac chamber 124. The discharge end of the metering unit body is closed by an outlet union 125 and ports 126 and 126a connect the space 127 in the body between the disc 120 and the union 125 and the acceptance or sac chamber 124.

When a pressure impulse is imposed on the oil in the chamber or inlet passage 112 a quantity of oil is forced from piping 131 through the port 111 and the filter 114 into the capillary tube 116 which thereupon contracts. The inverted cup valve 117 is forced off its seat 118 and oil from the capillary tube enters the capillary tube chamber 109 whence it passes through the ports 123 into the acceptance or sac chamber 124, compressing the sac 121. During the relatively long intervals between the pressure impulses, the sacs expand and oil is forced from the acceptance or sac chamber 124 through the ports 126 and 126a into the space 127 and the outlet union 125.

The flexible or gas-filled sac may consist of a length of plastic or other flexible tubing of relatively small dimensions having its ends sealed and containing air or gas either at atmospheric pressure or at an elevated pressure.

Fig. 10 illustrates the form of the invention shown in Figs. 1–3 modified to include said air or gas filled sac. The general structure of Fig. 10 is substantially the same as that described in connection with Fig. 3, except that the metering body 134 is substituted for the metering body 6. Body 134 includes the structural elements illustrated more particularly in Fig. 4, but is received in a modified hollow plug 136 that is in turn screwed into a threaded hole 5 formed in the manifold. The plug is formed with an internal annular groove 138 in which is mounted a ring-shaped air or gas filled sac 140, similar to sac 74a of Fig. 4. The hollow center of plug 136 comprises an oil acceptance chamber 142 in which said sac 140 is disposed. A sealing washer 144 may be interposed between the plug 136 and the body part 2. The inner end of plug 136 is spaced from the bottom of hole 5 to provide the aforementioned chamber 17. Inlet passage 3 (not shown) has communication with the space between the wall defining bore 4 and the the body 134.

The operation of the embodiment of Fig. 10 is the same as that shown in Fig. 4, except that the oil on each pressure impulse has access to the body 134 through passage 3, and after the impulse, the oil stored in the chamber 142 is slowly fed into chamber 17 and thence to passage 18, chamber 20, passages 22 and 23, and into the J-shaped outlet 24, 24a as before described.

Although in the construction described above, the pressure is imposed intermittently upon the oil fed to the metering devices, it will be understood that the oil may be fed at continuous pressure. The intermittent pressure may be imposed by a mechanically or manually-operated pump and the oil may be fed at continuous pressure by a pump or by gravity.

What I claim is:

1. A lubricant distributing system comprising a main oil carrying conduit, a main outlet connected to a part to be lubricated, at least one metering device connected to said conduit, said device including a coiled tube having a bore of capillary dimensions with an inlet end receiving oil from said conduit and an outlet end communicating with said part through said outlet, said tube constituting a flow resistance providing a pressure drop between the ends thereof for metering oil supplied to said part, a rising drop indicator between said tube and main outlet and comprising a vertically arranged J-shaped outlet tube having an inlet at its upper end and an outlet at its lower end, said last-named inlet being in communication with the outlet end of said capillary tube, a vertically arranged fine-gauge rod having its lower end mounted in the outlet of said J-shaped tube, and its upper end in communication with said main outlet, and a transparent bowl enclosing said J-shaped tube and said fine-gauge rod.

2. In a lubricant distribution system including a conduit for carrying lubricant under pressure, a metering device and a rising drop indicator unit, said device being connected to said conduit and including a coiled tube having a bore of capillary dimensions with an inlet end receiving lubricant from said conduit and an outlet end communicating with a part to be lubricated through a lubricant discharge passage, said tube constituting a flow resistance providing a pressure drop between the ends thereof for metering lubricant supplied to said part, said rising drop indicator being arranged between said tube and said lubricant discharge passage and comprising a vertically disposed J-shaped outlet tube having an inlet at its upper end and an outlet at its lower end, said last-named inlet being in communication with the outlet end of said capillary tube, and a vertically disposed fine gauge rod having its lower end mounted in the outlet of said J-shaped tube and its upper end in communication with said lubricant discharge passage.

3. The system set forth in claim 2 wherein a transparent bowl encloses said J-shaped tube and said fine gauge rod.

4. The system set forth in claim 2 wherein the metering device is enclosed in a bore which intersects and communicates with said main conduit, and wherein the outlet from said device is connected by a transfer passage to the inlet of the rising drop indicator.

5. The system set forth in claim 2 wherein the outlet from said metering device is connected by a transfer passage to a transfer chamber which is connected by a second transfer passage to the inlet of said J-shaped tube.

6. The system set forth in claim 2, wherein compressible means is interposed between said device and said J-tube, said compressible means being compressed by the lubricant passing from the outlet of said device and maintaining a substantially constant pressure on the lubricant entering said J-tube.

7. In a lubricating device including a main oil carrying conduit communicating with a part to be lubricated through a lubricant discharge passage, the improvement comprising a coiled tube positioned between the conduit and the passage, said tube having a bore of capillary dimensions and being provided with an inlet communicating with the conduit and an outlet communicating with the passage, and a rising drop indicator positioned between the outlet of said tube and the passage, said indicator comprising a vertically disposed J-shaped conduit having an inlet at its upper end and an outlet at its lower end, said last-mentioned inlet communicating with said outlet of said tube, and a vertically disposed fine-gauge rod mounted in the outlet of said J-shaped conduit, with the upper end of said rod being in communication with the passage.

UNITED STATES PATENTS

References Cited in the file of this patent

| | | |
|---|---|---|
| 1,905,527 | Thomas | Apr. 25, 1933 |
| 2,047,352 | Blanchard | July 14, 1936 |
| 2,363,754 | Smith | Nov. 28, 1944 |
| 2,499,571 | Davis | Mar. 7, 1950 |

FOREIGN PATENTS

| | | |
|---|---|---|
| 305,204 | Great Britain | July 18, 1929 |